(12) United States Patent
Hyndman et al.

(10) Patent No.: US 9,552,201 B2
(45) Date of Patent: Jan. 24, 2017

(54) SYSTEM AND METHOD FOR INCREMENTAL SOFTWARE INSTALLATION

(75) Inventors: Arn Close Hyndman, Ottawa (CA); Gordon Frederick Walls, Nepean (CA)

(73) Assignee: Avaya Inc., Basking Ridge, NJ (US)

( * ) Notice: Subject to any disclaimer, the term of this patent is extended or adjusted under 35 U.S.C. 154(b) by 197 days.

(21) Appl. No.: 13/222,392

(22) Filed: Aug. 31, 2011

(65) Prior Publication Data
US 2013/0055231 A1 Feb. 28, 2013

(51) Int. Cl.
G06F 9/44 (2006.01)
(52) U.S. Cl.
CPC ........................ *G06F 8/68* (2013.01)
(58) Field of Classification Search
None
See application file for complete search history.

(56) References Cited

U.S. PATENT DOCUMENTS

| | | | |
|---|---|---|---|
| 5,202,982 A * | 4/1993 | Gramlich et al. | |
| 5,619,698 A * | 4/1997 | Lillich et al. | 717/168 |
| 5,835,777 A * | 11/1998 | Staelin | G06F 8/61 |
| | | | 717/175 |
| 5,867,162 A * | 2/1999 | O'Leary et al. | 715/843 |
| 5,875,318 A * | 2/1999 | Langford | 716/103 |
| 5,901,225 A * | 5/1999 | Ireton et al. | 714/6.32 |
| 6,092,105 A * | 7/2000 | Goldman | 709/217 |
| 6,438,743 B1 * | 8/2002 | Boehm et al. | 717/122 |
| 7,236,610 B1 * | 6/2007 | Luo et al. | 382/100 |
| 7,472,272 B2 * | 12/2008 | Stamos et al. | 713/164 |
| 7,562,356 B2 * | 7/2009 | DeFolo | 717/169 |
| 7,562,358 B2 | 7/2009 | Bennett et al. | |
| 7,711,958 B2 * | 5/2010 | Carro | G06F 21/64 |
| | | | 713/179 |
| 7,823,146 B2 * | 10/2010 | Surace | 717/169 |
| 7,966,602 B1 * | 6/2011 | Webster | G06F 8/48 |
| | | | 717/114 |

(Continued)

OTHER PUBLICATIONS

"A Practical Fast Method for Medicla Imaging Transmission based on the DICOM Protocol", by Rouzbeh Maani, 2010, p. 1-11, [online][retrieved on Apr. 18, 2013]. Retrieved from <http://proceedings.spiedigitallibrary.org/proceeding.aspx?articleid=748197>.*

(Continued)

*Primary Examiner* — Evral E Bodden
(74) *Attorney, Agent, or Firm* — Sheridan Ross P.C.

(57) ABSTRACT

Disclosed herein are systems, methods, and non-transitory computer-readable storage media for performing incremental software installations. The system identifies a set of files associated with one or more software programs. Each file can be a component of a software program, or any file accessed by the software program or system when the software program is executed. The system receives a list of files associated with a software version that is not installed on the system. The system determines the differences between the set of files and the list of files, and receives a missing file from the list of files based on the differences. Finally, the system builds the software version on the system using the set of files and the missing file. In building the software version, the system does not assume a linear progression of updates and is able to reuse existing files to create nonlinear variations of software.

20 Claims, 7 Drawing Sheets

(56) References Cited

U.S. PATENT DOCUMENTS

| | | | |
|---|---|---|---|
| 8,117,277 B2* | 2/2012 | Nikiel et al. | 709/217 |
| 8,527,465 B1* | 9/2013 | Aliev et al. | 707/650 |
| 8,689,232 B2* | 4/2014 | Monnie | G06F 9/526 |
| | | | 719/310 |
| 8,719,772 B2* | 5/2014 | Singla | G06F 8/36 |
| | | | 717/106 |
| 8,930,899 B2* | 1/2015 | Chan | G06F 8/41 |
| | | | 717/101 |
| 9,250,938 B2* | 2/2016 | Herring | G06F 9/4552 |
| 2002/0092011 A1* | 7/2002 | Liu et al. | 717/169 |
| 2002/0184184 A1* | 12/2002 | Holcomb | G06F 17/30067 |
| 2003/0033313 A1* | 2/2003 | Zweifel et al. | 707/100 |
| 2004/0237079 A1* | 11/2004 | Cox | G06F 8/65 |
| | | | 717/168 |
| 2007/0180421 A1* | 8/2007 | Boose | G06F 17/5095 |
| | | | 716/139 |
| 2008/0109528 A1* | 5/2008 | Knight et al. | 709/217 |
| 2008/0126672 A1* | 5/2008 | Ljung | 711/103 |
| 2009/0094592 A1* | 4/2009 | Alam et al. | 717/168 |
| 2009/0249284 A1* | 10/2009 | Antosz et al. | 717/104 |
| 2010/0268626 A1* | 10/2010 | Tingle et al. | 705/30 |
| 2012/0317421 A1* | 12/2012 | Gounares | 713/189 |
| 2013/0055220 A1* | 2/2013 | Murthy | 717/132 |

OTHER PUBLICATIONS

"Incremental Installer Design", downloaded from the web http://wiki.secondlife.com/wiki/Incremental_Installer_Design, modified on Jun. 12, 2011. Copyright 201 2009 Linden Research, Inc., Licensed under Creative Commons Attribution-Share; 3 pages.

* cited by examiner

SYSTEM AND METHOD FOR INCREMENTAL SOFTWARE INSTALLATION

BACKGROUND

1. Technical Field

The present disclosure relates to software versioning and more specifically to efficiently and adaptively performing incremental software installations.

2. Introduction

Software developers are distributing their software in many rapidly evolving ways. Originally, software developers distributed software in physical media. For example, CDs and DVDs containing a particular software program were mailed or distributed via retail outlets. The expenses and inefficiencies of this approach have prompted new strategies for software distribution.

More recently, network distribution of software has partially replaced physical media as the favored distribution method. With network distribution of software, developers provide a software installation package which users can download from a web browser or other network connection. The installation package is typically pre-configured to install the software application or download and execute the main installation package. The software application or installation package may include a process that checks for a more current version and downloads the most current version or updates to that version.

To update a specific version of software on a device, the installation package is typically pre-configured to perform a complete installation of the latest version of the software. However, a complete installation can be time-consuming and may result in multiple versions of software on the device. Thus, as an alternative, the installation package is often pre-configured to update the software on the device by installing a linear progression of updates, from lower release numbers to higher. Each update is developed beforehand and pre-configured to update a specific version of software. Both solutions assume that only the latest version of software is required, which limits the range of deployments and customizations possible. Each installation and update application requires large amounts of manual effort to construct, and each requires a large amount of time to test—a potentially slow and expensive proposition.

The current software installation methods can be difficult and expensive, particularly at scale. Users generally need to be informed that an installation is required. Sufficient permissions must be acquired on the target system for software deployment. Update installations can result in multiple versions of the software on the device. Older versions of software may occupy large amounts of disk space and can be difficult to remove. The process of updating the software is inflexible and time-consuming. A large amount of manual effort is required to construct, test, and implement installation and update applications. The static nature of current installation systems result in limited scalability and customization.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to perform efficient and adaptive incremental software installations that yield software variations which serve specific operating conditions. The incremental software installations can reuse components installed on the system, and multiple versions of software can coexist and even share system resources. By reusing components and sharing resources, the incremental software installation can significantly reduce the amount of bandwidth and disk space required for the storage, use, and installation of the software. Moreover, the incremental software installations are adaptive and do not require a linear progression of updates. This allows rapid installation of software variations and greatly increases the type of deployments possible—upgrades, downgrades, updates, patches, variations, combination builds, etc. The incremental software installations are efficient and minimize the effort required to construct, both from the user and the developer. Further, the software variations are likely to perform better because they correspond with the specific operating conditions. These approaches can provide space savings on clients, conserve bandwidth, allow multiple co-existing versions of software, upgrade to a newer software version, downgrade to an older software version, and so forth.

Disclosed are systems, methods, and non-transitory computer-readable storage media for performing incremental software installations. The method is discussed in terms of a system configured to practice the method. The system identifies a set of files, and each file is associated with a software program. A file can be a component of the software program it is associated with, or any file accessed or relied upon by the software program or system when the software program is executed, upgraded or installed. The system then receives a list of files associated with a software version that is not installed on the system. The software version can be a program that contains the software components specified by the operating conditions. The list of files can include a list of software components required to execute, upgrade, or install the software version.

After receiving the list of files, the system determines the differences between the set of files and the list of files. The system then receives one or more missing files from the list of files based on the differences. Finally, the system builds the software version on the system using the set of files and the missing files. Here, the system does not assume a linear progression of updates and is able to reuse existing files to create nonlinear variations of software. The simplest example includes two files, but the same principles can extend to multiple files from multiple software packages. This approach can provide for new software installations, updates, upgrades and/or downgrades. Software can include consumer or enterprise applications, as well as operating systems, databases, firmware, ROMs, middleware, device drivers, executable files, plug-ins, extensions, configuration files, software libraries, and so forth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for a way to perform efficient and adaptive incremental software installations. A system, method and non-transitory computer-readable media are disclosed which perform incremental software installations by computing the difference between software components installed on a system and the software components required by the current conditions, and using the difference to perform rapid and secure deployment of software variations. A brief introductory description of a basic general purpose system or computing device in FIG. 1 which can be employed to practice the concepts is disclosed herein. A more detailed description of incremental software installation and related approaches will then follow. Multiple variations shall be discussed herein as the various embodiments are set forth. The disclosure now turns to FIG. 1.

Figure 1:
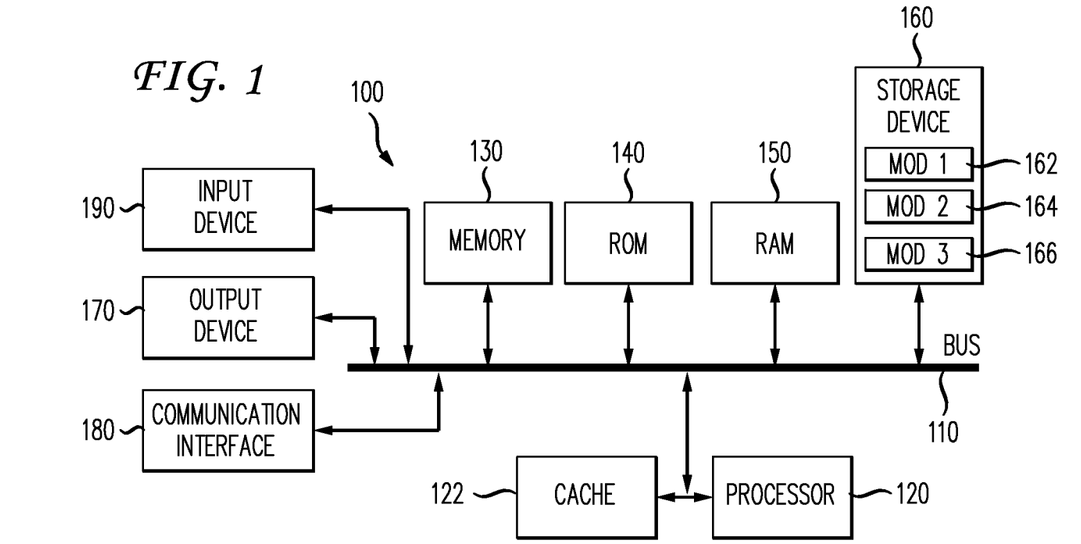
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as flash memory cards, digital versatile disks, cartridges, random access memories (RAMs) 150, read only memory (ROM) 140, and the like, may also be used in the exemplary operating environment. Computer-readable storage media or devices expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
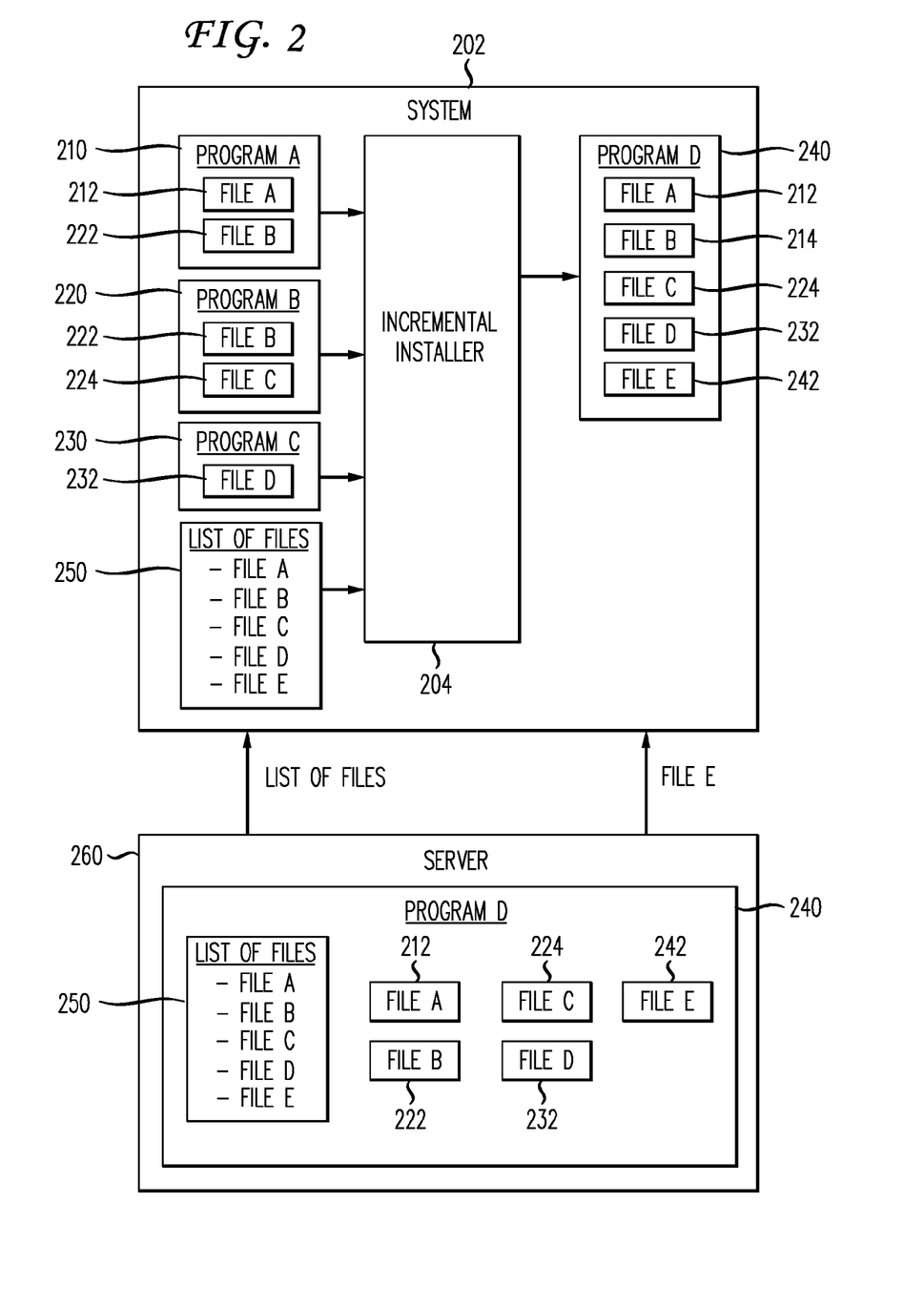
FIG. 2 illustrates a first exemplary architecture for performing incremental software installations.

Having disclosed some components of a computing system, the disclosure now turns to FIG. 2, which illustrates a first exemplary architecture for performing incremental software installations. For the sake of clarity, FIG. 2 is discussed in terms of an exemplary system, as shown in FIG. 1, configured to incrementally upgrade, downgrade, install, or otherwise modify software.

In this example, the system 202 identifies File A 212, File B 222, File C 224, and File D 232. This can be triggered by a determination that a Program D 240 is required by the current conditions. Alternatively, the process can be triggered by another device, an operation, a flag, policy, schedule, message, software process, user, and so forth. For example, the system 202 can receive a determination, from an incremental installer 204, that a Program D 240 is required by the current conditions. Program D 240 can be any software program that contains the software components necessary for the current conditions. The current conditions can depend on the user, hardware, software, network, and security requirements and limitations, or any other variable affecting software functionality, performance, or usability. For example, a device may need specific software or software components to communicate with different devices on a network, access or connect to specific hardware or software resources, load specific pages, view or edit specific files, conform to network policies, or perform particular computing operations—these considerations, among others, chart the operating conditions according to the specific circumstances.

In our example, File A is associated with a Program A 210, File B 222 is associated with a Program A 210 and Program B 220, File C 224 is associated with Program B 220, and File D 232 is associated with a Program C 230. In one embodiment, Program A 210, Program B 220, and Program C 230 are unrelated to each other. In another embodiment, Program A 210, Program B 220, and Program C 230 can be related. In yet another embodiment, Program A 210, Program B 220, and Program C 230 can be a different (e.g., older, newer, modified) version of another software program installed on the system 202.

A file can be a component of the program it is associated with, or any file accessed by the program or system 202 when the program is executed, upgraded or installed. For example, File A 212 can be a component of Program A 210, or any file accessed by Program A 210 or system 202 when Program A 210 is executed, upgraded or installed. Each file and program has a unique identifier, such as a file ID or hash, based on the version or contents of the file or program.

A unique identifier can be any identifier that uniquely identifies a file and/or its contents. Moreover, a unique identifier can be a separate file or incorporated as part of a file, such as the file it identifies. The unique identifier can be generated at any time, including runtime, and used by the system 202 or incremental installer 204 to identify the file, program, or both. Because files can change in ways that do not affect their function, a custom hashing function that is aware of the structure of the file can be used when generating a unique identifier, in order to exclude any bytes of the file that are not relevant to execution and/or change from build to build. For example, a .dll file may contain a date and timestamp, which was added to the file when the source code was compiled to build the file. Even if the source code compiled to build the .dll file does not change, the .dll file can change slightly each time the file is compiled (built), as a date and timestamp is added to the file. Accordingly, a custom hashing function that ignores such differences can be used in order to maximize the opportunity to reuse existing files.

Next, the system 202 receives a list of files 250 associated with a Program D 240 which is not installed on the system 202. The list of files 250 includes a catalogue of files needed to execute, upgrade, or install Program D 240, and/or a unique identifier for each file. For example, the list of files 250 can include a list of software components needed to execute, upgrade, or install Program D 240, where the software components are identified by their respective unique identifiers. Thus, the list of files 250 is associated with Program D 240 and can be used to represent and/or identify Program D 240. In addition, the list of files 250 includes a unique identifier for the list of files 250. In one aspect, a hash function can be applied to the contents of the list of files 250 to obtain a unique identifier for the list of files 250 represented by the hash value. In this example, the resulting hash code represents the components of Program D 240, and can therefore be used to identify Program D 240. The list of files 250 can also include directory information for the files, file sizes, client version, load type (e.g., alpha, beta, release, debug, development, etc.), patch information, a digital signature, and a version of the list of files 250.

In one embodiment, the process of generating a unique identifier for each file from the list of files 250 and creating the list of files 250 is automated. Here, a software tool is used that automatically hashes or signs each file from the list of files 250, and creates the list of files 250. The resulting list of files 250 and the hashed or signed files from the list of files 250 can be stored in a server 260 used to facilitate deployment. In one aspect, the software tool uses a custom function to automatically hash the files. Here, the custom function generates a hash value based on the contents of the file that are relevant to the use and/or execution of the file. The custom function is aware of the structure of certain types of files and can therefore exclude those parts of the file that change each time the file is built. The resulting hash value, which is used to uniquely identify the file, represents those portions of the file that are relevant to the use and/or execution of the file, excluding any portions that change from build to build. As a result, files can retain their identity and function even after they are modified, as long as a portion that is relevant to the use and/or execution of the file is not modified. This can maximize the opportunity to reuse files because it increases the likelihood that an existing file will be deemed to match a functionally equivalent file in the list of files 250.

The system 202 can receive the list of files 250 from a server 260, which can be any device configured to communicate with the system 202. For example, the server 260 can be a device on the local network, a device on the Internet, or computer readable media attached to the system 202 or shared on a network. Alternatively, the system 202 can receive the list of files 250 from a cache on the system 202. For example, if a copy of the list of files 250 is stored on a local cache, the system 202 can quickly retrieve the list of files 250 from the local cache. This avoids unnecessary network downloads and further improves performance.

As indicated above, the system 202 can have a cache that holds File A 212, File B 222, File C 224, File D 232, the list of files 250, Program A 210, Program B 220, Program C 230, any file used by the incremental installer 204, and/or any program built by the incremental installer 204. A cache can be a directory, file, page, memory (virtual and/or physical), or storage. In one aspect, the system 202 or incremental installer 204 can treat any file, including the list of files 250 and/or File A 212, File B 222, File C 224, File D 232 as a cache. Also, the system 202 can have various policies to control the size of the cache. In one aspect, the cache is configured to have a maximum cache size. The maximum cache size can be set by the system 202, incremental installer 204, a user, program, or policy. In one aspect, the maximum cache size can be automatically determined, for example, as a percentage of a disk or memory size. Once the cache reaches the set maximum cache size, the system 202 can delete and/or replace files according to a file replacement or deletion policy. For example, files can be removed on a least recently used (LRU) basis once the cache reaches the set maximum cache size.

After receiving the list of files 250, the system 202 or incremental installer 204, which may be integrated into the system or may be a separate, external component, determines the differences between File A 212, File B 222, File C 224, File D 232 and the list of files 250. In one variation, the server 260 determines the differences between File A 212 and the list of files 250. The differences can be obtained by comparing the unique identifiers for File A 212, File B 222, File C 224, File D 232 with the unique identifiers included in the list of files 250. Alternatively, the differences can be obtained by comparing the unique identifiers associated with File A 212, File B 222, File C 224, File D 232 with a unique identifier associated with the list of files 250. In one aspect, the incremental installer 304 determines the differences by comparing digital signatures associated with File A 212, File B 222, File C 224, File D 232 with a digital signature associated with the list of files 250 and/or at least one of the files from the list of files 250. In another aspect, the incremental installer 204 determines the differences by comparing the hash codes in the list of files 250 with the hash codes for File A 212, File B 222, File C 224, File D 232.

The system 202 then receives a File E 242 from the list of files 250 based on the differences. As shown in FIG. 2, File E represents the difference between File A 212, File B 222, File C 224, File D 232 and the list of files 250. For security purposes, the File E 242 can be transmitted in a manner that allows the system 202 to verify the file's authenticity. In one aspect, a hash function is applied to File E 242 to ensure file integrity. Here, the same hash function used to generate a unique identifier can be used ensure file integrity. Alternatively, a different hash function can be used to ensure file integrity. In one aspect, a cryptographic hash function, such as MD5, SHA-1, and SHA-2, is used to securely authenticate File E 242. In yet another aspect, File E 242 (or its hash code) is digitally signed using a public and private key system to verify authenticity. Because certain file formats do not support digital signatures directly, a file signature can be provided in a separate file. For example, a file signature can be provided in the list of files 250. To maximize performance, File E 242 can be transmitted using data compression. Also, the system 202 can be configured to use multi-threading communications with overlapped decompression for receiving and decompressing File E 242.

Finally, as seen from FIG. 2, the incremental installer 204 builds Program D 240 on the system 202 using File A 212, File B 222, File C 224, File D 232 and File E 242. Here, the incremental installer 204 is flexible and efficient, as it does not assume a linear progression of updates, and is able to reuse existing files to create nonlinear variations of software. To allow reuse of existing files, the system 202 or incremental installer 204 can preserve the required relative locations of the files. For example, a software program can have certain expectations regarding the relative locations of its component files. Accordingly, when reusing a file, the system 202 or incremental installer 204 can copy the file into a directory structure that preserves the relative location of the file as required by the software program. Alternatively, the system 202 or incremental installer 204 can include a hard link to the file in the appropriate directory structure, such that the file appears to be in the appropriate location, but the data associated with the file does not actually have to be copied to that location. The use of hard links, as illustrated, can help minimize disk usage, save resources, and reduce installation time.

In one embodiment, the incremental installer 204 can build Program D 240 on the system 202 using File A 212, File B 222, File C 224, File D 232, File E 242 and/or any subcomponents thereof. In this example, the system 202 identifies File A 212, File B 222, File C 224, File D 232 and/or any subcomponents thereof. The system 202 then receives a list of files 250 associated with Program D 240. The list of files 250 includes a list of subcomponents with unique identifiers. A subcomponent can be defined as a block or segment, such as a fixed length chunk of a file. For example, subcomponents can be set to 1k blocks, so a 5k file would be divided into 5 blocks or subcomponents. Next, the incremental installer 204 determines the differences between File A 212, File B 222, File C 224, File D 232, or any subcomponents thereof, and the list of files 250. The system 202 and/or incremental installer 204 then receives a File E 242 and/or a subcomponent thereof. Finally, the incremental installer 204 can build Program D 240 on the system 202 using File A 212, File B 222, File C 224, File D 232, File E 242 and/or any subcomponents thereof.

Figure 3:
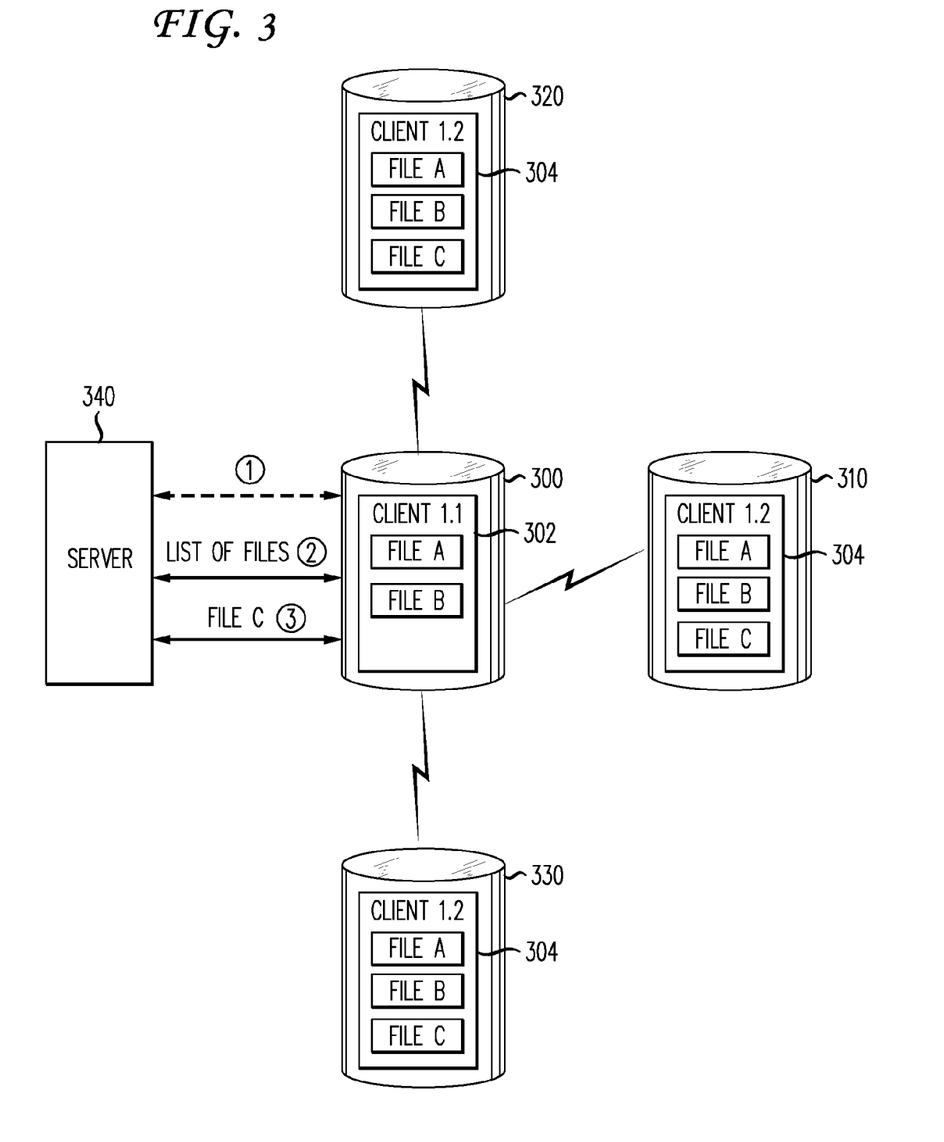
FIG. 3 illustrates an example of a client device on a network performing an incremental software installation based on situational requirements of the client device.
Figure 4:
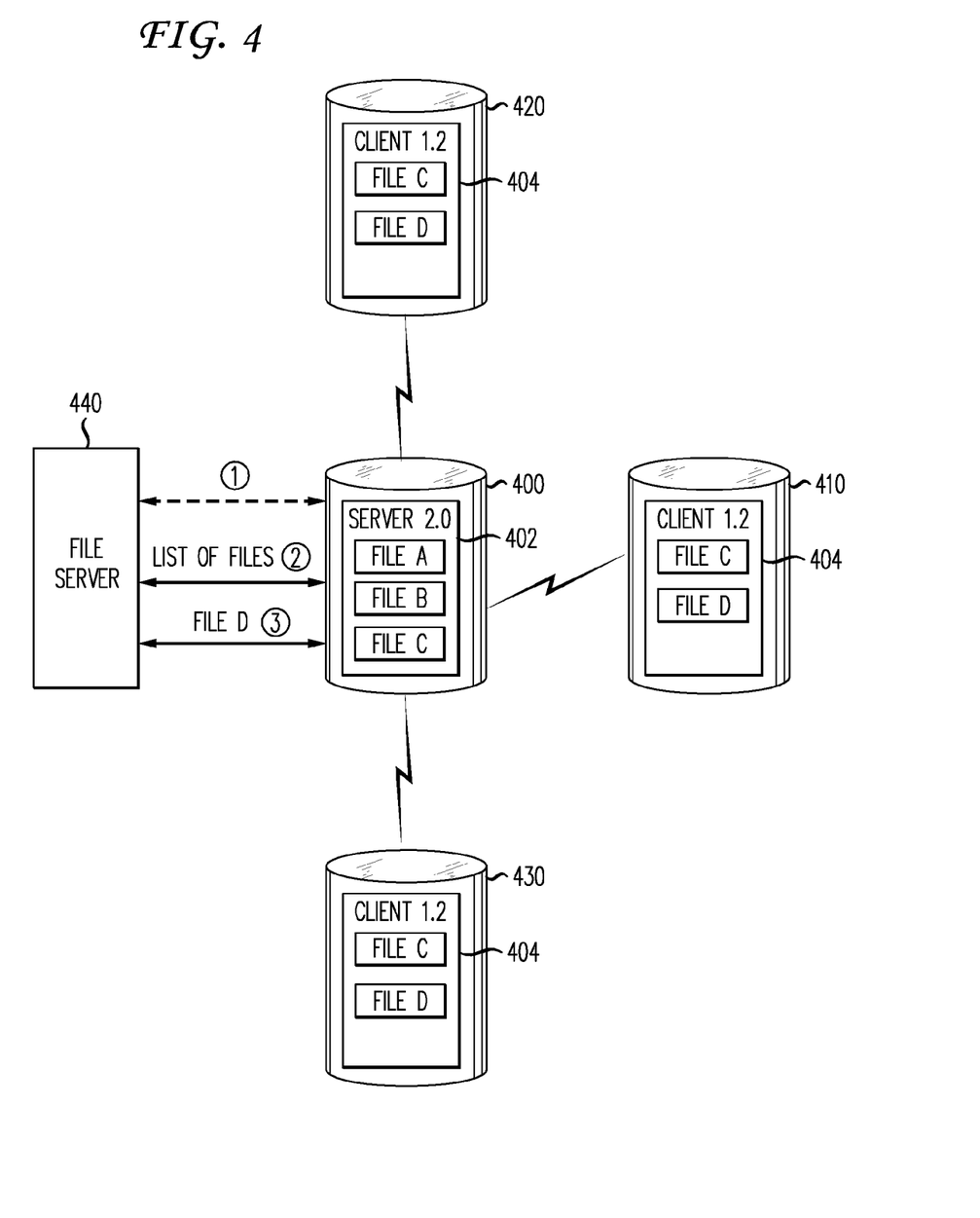
FIG. 4 illustrates an example of a server device on a network performing an incremental software installation based on situational requirements of the server device.

The disclosure now turns to FIGS. 3 and 4, which illustrate devices on a network performing an incremental software installation based on situational requirements or an operating environment such as operation specification, neighboring device compatibility and so forth.

FIG. 3 shows various client devices 300, 310, 320, 330 on a network. Here, the client device 300 is running Client 1.1 302. On the other hand, each of the other client devices 310, 320, 330 on the network are running Client 1.2 304. In one aspect, the client device 300 or an incremental installer object can detect if a different version of the client software is necessary to communicate properly, efficiently, or at all with the other client devices 310, 320, 330. If so, the client device 300 can begin an incremental software installation to install the necessary client software. For example, the client device 300 can identify a unique identifier associated with Client 1.1 302 and initiate an incremental software installation if the unique identifier does not correspond to Client 1.2 304. In this example, the client device 300 can then request a list of files associated with Client 1.2 304.

The client device 300 identifies the files associated with Client 1.1 302. Then, the client device 300 receives a list of files associated with Client 1.2 304. In one aspect, the client device 300 receives the list of files from a server 340. In another aspect, the client device 300 receives the list of files from a local cache. In yet another aspect, the client device 300 receives the list of files from one or more client devices 310, 320, 330 on the network.

Next, the client device 300 determines differences between the files associated with Client 1.1 302 and the list of files. Based on the differences, the client device 300 receives a missing file (e.g., File C). In one aspect, the client device 300 receives the missing file from the server 340. In another aspect, the client device 300 receives the missing file from one or more client devices 310, 320, 330 on the network. For example, the client device 300 can download the missing file from the closest device on the network, which can be the server 340 or any of the other client devices 310, 320, 330. In one embodiment, the client device 300 determines what files are needed and fetches them. For example, the client device 300 can request and/or download the files from the server 340, other client devices 310, 320, 330, or a file repository. In another embodiment, the server 340 determines what files are needed and pushes them to the client device 300. For example, the server 340 or other client device 310, 320, 330 can transmit File C to the client device 300 if it detects that the client device 300 is running Client 1.1 302, has a different file identifier, or is trying to access a resource that requires Client 1.2 302. The server 340 or other client device 310, 320, 330 can also transmit File C automatically based on specific a condition, such as a flag, policy, status, schedule, etc. In addition, a specific action, such as a login attempt, page or file request, communication delay, an attempt to access a resource or perform an operation, etc., can trigger the server 340 or other client device 310, 320, 330 to transmit File C to the client device 300. Finally, the client device 300 builds Client 1.2 304 using the files associated with Client 1.1 302 (e.g., File A and File B) and the missing file (e.g., File C).

As shown in FIG. 4, a server device 400 builds client software 404 using the files associated with server software 402 installed on the server device 400. First, the server device 400 identifies a list of files associated with the server software 402 (e.g., File A, File B, and File C). The server device 400 then receives a list of files associated with the client software 404 from a file server 440. In one aspect, the file server 440 can store the list of files received by the server device 400. In another aspect, the file server 440 can generate a unique identifier for each file and build the list of files received by the server device 400.

Next, the server device 400 determines the differences between the files associated with the server software 402 (e.g., File A, File B, and File C) and the list of files associated with the client software 404 (e.g., File C and File D). Then, the server device 400 receives a missing file (e.g., File D) from the file server 440 based on the differences. In one aspect, the server device 400 receives multiple missing files based on the differences. Here, the missing files can be downloaded individually or auto bundled. In another aspect, the server device 400 receives the missing file from a web server. Finally, the server device 400 builds the client software 404 using the files associated with the server software 402 and the missing file (e.g., File D).

Figure 5:
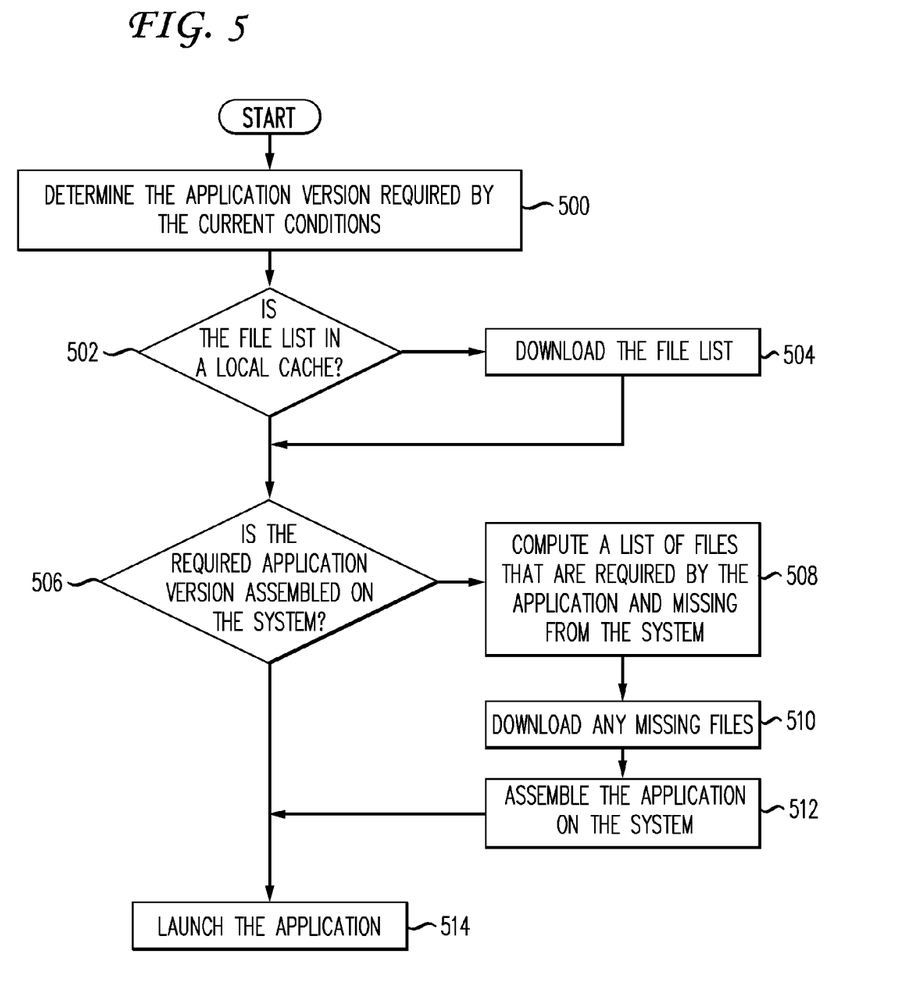
FIG. 5 illustrates a first exemplary method embodiment.
Figure 6:
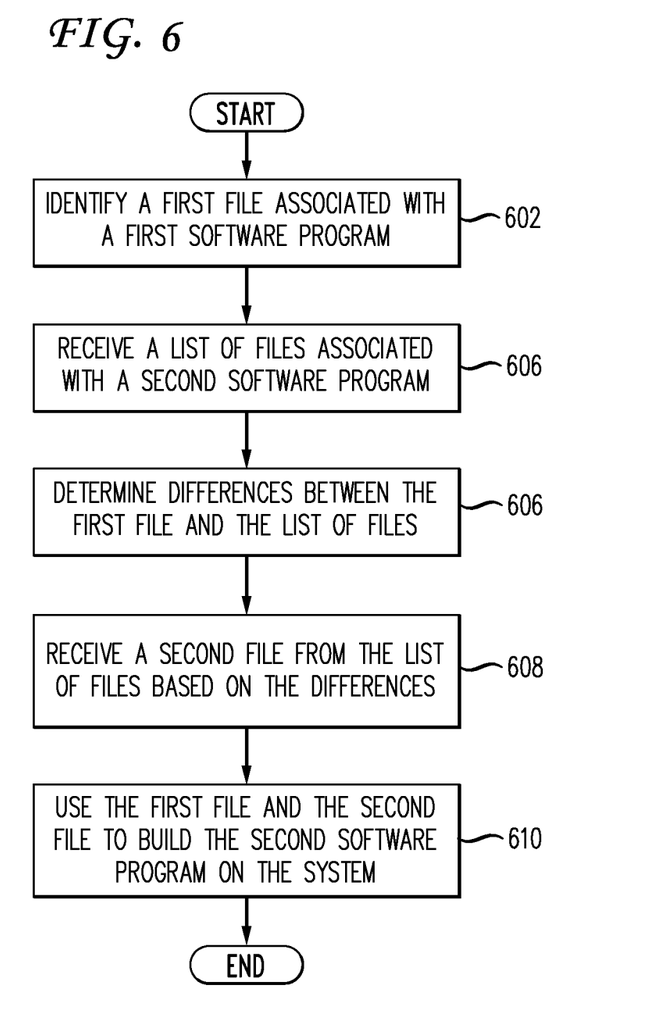
FIG. 6 illustrates a second exemplary method embodiment.

Having disclosed various embodiments, the disclosure now turns to the exemplary method embodiments shown in FIGS. 5 and 6. For the sake of clarity, FIGS. 5 and 6 are discussed in terms of an exemplary system 100, as shown in FIG. 1, configured to practice the method. The steps outlined herein are exemplary and can be implemented in any combination thereof, including combinations that exclude, add, or modify certain steps.

As shown in FIG. 5, the system 100 first determines the application version required by the current conditions (500). Here, the version is defined by a hash of the application's file list. The hash code can serve as a unique identifier and/or can be used to ensure file integrity. The application's file list includes a list of files associated with the application. The files in the file list can be identified by unique identifier, which can be generated using a hash function. The system 100 then determines if the file list is in a local cache on the system 100 (502). If the file list is not cached, the system 100 downloads the file list from another device (504). Otherwise, the system 100 retrieves the file list from cache.

Next, the system 100 determines if the required application version is assembled on the system 100 (506). If the required application version is already assembled on the system 100, the system 100 can launch the application (514). Otherwise, the system 100 computes a list of files that are required by the application and missing from the system 100 (508). This can be done by comparing the hash codes in the file list with those in the system 100 or local cache. Based on the results, the system 100 then downloads any missing files (510) and assembles the application on the system 100 (512). In one aspect, the system 100 uses hard links when building the application on the system 100. After building the application, the system 100 can launch the application (514).

FIG. 6 illustrates another method embodiment. The system 100 first identifies a first file associated with a first software program (602). The system 100 then receives a list of files associated with a second software program (604). After receiving the list of files, the system 100 determines differences between the first file and the list of files (606). This can be done, for example, by comparing a digital signature associated with the first file with a digital signature associated with the list of files. In one aspect, the difference corresponds to the digital signature of a second file in the list of files. In another aspect, the difference corresponds to the contents of a second file in the list of files. In yet another aspect, the difference corresponds to the digital signature of multiple files in the list of files.

Next, the system 100 receives a second file from the list of files based on the differences (608). The second file can be transmitted using data compression to maximize performance. The system 100 then uses the first file and the second file to build the second software program on the system 100 (610). In another variation, the system 100 builds the second software program on the system 100 using the first file, the second file, and at least one other missing file.

Figure 7:
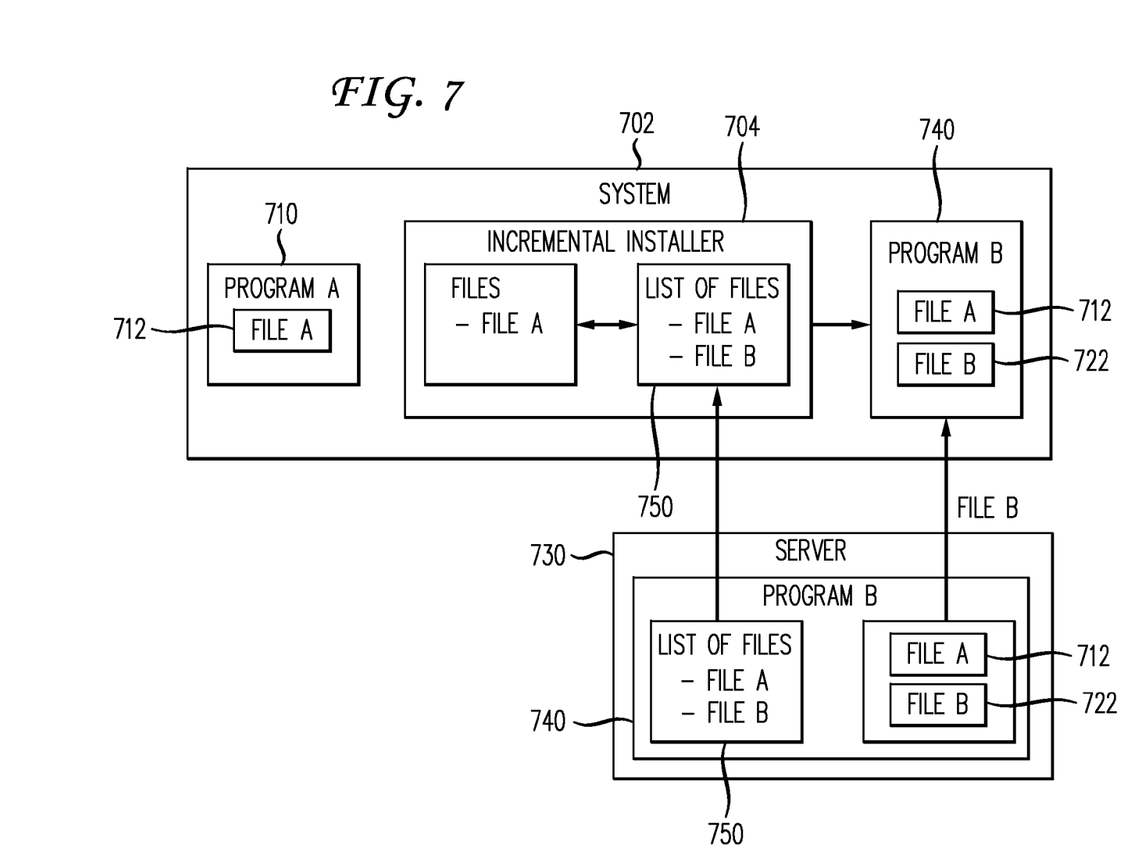
FIG. 7 illustrates a second exemplary architecture for performing incremental software installations.

The disclosure now turns to FIG. 7, which illustrate which illustrates a second exemplary architecture for performing incremental software installations. For the sake of clarity, FIG. 7 is discussed in terms of an exemplary system, as shown in FIG. 1, configured to incrementally upgrade, downgrade, install, or otherwise modify software.

In this example, the system 702 first identifies a File A 712 associated with a Program A 710. File A 712 can be a component of Program A 710, or any file accessed by Program A 710 or system 702 when Program A 710 is executed, upgraded or installed. Both File A 712 and Program A 710 have a unique identifier, such as a file ID or hash, based on the version or contents of the file. The unique identifier can be generated at any time, including runtime, and used by the system 702 or an incremental installer 704 to identify File A 712, Program A 710, or both. A unique identifier can be any identifier that uniquely identifies a file and/or its contents. For example, a unique identifier can be a digital signature associated with File A 712, Program A 710, or both. In another example, the unique identifier for File A 712 can be derived using a hash of the contents of File A 712.

Next, the system 702 receives a list of files 750 associated with a Program B 740 which is not installed on the system 702. The list of files 750 includes a list of unique identifiers which represents the files needed to execute, upgrade, or install Program B 740. In addition, the list of files 750 includes a unique identifier for the list of files 750. In one aspect, a hash function is applied to the contents of the list of files 750 to obtain a unique identifier for the list of files 750 represented by the hash value. In this example, the resulting hash code represents the components of Program B 740, and can therefore be used to identify Program B 740. Program B 740 can be any software program that contains the software components necessary for the current conditions.

After receiving the list of files 750, the system 702 or an incremental installer 704, which may be integrated into the system or may be a separate, external component, determines the differences between File A 712 and the list of files 750. In one variation, the server 730 determines the differences between File A 712 and the list of files 750. The differences can be obtained by comparing the unique identifier of File A 712 with the unique identifiers included in the list of files 750. Alternatively, the differences can be obtained by comparing a unique identifier associated with File A 712 with a unique identifier associated with the list of files 750. For example, the differences can be determined by comparing a hash code of the contents of File A 712 with a hash code of the contents of the list of files 750.

The system 702 then receives a File B 722 from the list of files 750 based on the differences. As shown in FIG. 7, File B represents the difference between File A 712 and the list of files 750. Finally, the incremental installer 704 builds Program B 740 on the system 702 using File A 712 and File B 722. While FIG. 7 shows only one file missing, the system 702 may be missing more than one file or resource and may not have any of the required components for the desired program or version.

In some variations of the provided examples, the client determines which software version is needed and requests from a server a list of files needed to install and/or execute that software version. Then the client can compare the list of files to available files on the client and fetch those files from a server. Alternatively, the client can transmit a list of operating and/or network conditions and a list of available files to the server, which determines which software version is needed on the client based on the operating and/or network conditions, compares the list of available files to a list of needed files, and transmits missing files and/or instructions for assembling/installing the files to the client for installation. The server can optionally package a custom upgrade, downgrade, or install package tailored for the client based on exactly which resources are available at that client.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to virtually any software installation in any situation or change. Those skilled in the art will readily recognize various modifications and changes that may be made to the principles described herein without following the example embodiments and applications illustrated and described herein, and without departing from the spirit and scope of the disclosure.

We claim:

1. A method comprising:
identifying, by a target device of a software installation, a first file and a second file that are stored on the target device, wherein the first file is required to execute a first software program previously installed on the target device and the second file is required to execute a second software program previously installed on the target device;
receiving, by the target device, a list of files that are required to execute a third software program on the target device, the list of files comprising the first file, the second file, and a third file;
generating, by the target device during runtime, a unique identifier for each of the first file, second file, and third file, wherein the unique identifier is generated using a hash function applied to contents of the first file, second file, and third file to generate a first unique identifier, a second unique identifier, and a third unique identifier, respectively;
determining, by the target device, whether files included in the list of files are present on the device to yield a determination, wherein the determination includes an analysis of the first unique identifier, second unique identifier, and third unique identifier;
based on the determination, receiving the third file at the target device; and
building, by the target device, the third software program on the target device using the first file, the second file, and the third file.

2. The method of claim 1, wherein the first file is not required to execute the second software program and the second file is not required to execute the first software program.

3. The method of claim 1, wherein the list of files further comprises a fourth file, wherein the fourth file is required to execute the first software program and the second software program.

4. The method of claim 1, wherein determining whether the files included in the list of files are present on the target device comprises comparing the first unique identifier, the second unique identifier, and third unique identifier with identifiers contained in the list of files.

5. The method of claim 1, wherein the hash function comprises a cryptographic hash function.

6. The method of claim 1, further comprising:
digitally signing the first unique identifier, the second unique identifier, and the third unique identifier with a key.

7. The method of claim 1, further comprising receiving, from an incremental installer object, a determination that the third software program is required at the target device.

8. The method of claim 1, wherein the third file is received from a second device having transmitted the third file in a manner resistant to tampering.

9. The method of claim 1, further comprising:
using the hash function to further ensure file integrity of the first file, the second file, and the third file.

10. A system comprising:
a processor; and
a non-transitory computer-readable storage medium storing instructions configured to when executed by the processor, cause the processor to perform an incremental software installation on the system:
accessing a first file and a second file that are stored at the system, wherein the first file is required to execute a first software program previously installed on the system and the second file is required to execute a second software program previously installed on the system;
receiving a list of files that are required to execute a third software program, the list comprising the first file, the second file, and a third file;
generating, during runtime, a unique identifier for each of the first file, second file, and third file, wherein the unique identifier is generated using a hash function applied to contents of the first file, second file, and third file to generate a first unique identifier, a second unique identifier, and a third unique identifier, respectively;
determining whether files included in the list of files are present on the device to yield a determination, wherein the determination includes an analysis of the first unique identifier, second unique identifier, and third unique identifier;
based on the difference, receiving the third file at the system; and
building the third software program on the system using the first file, the second file, and the third file.

11. The system of claim 10, wherein the hash function comprises a cryptographic hash function.

12. The system of claim 11, wherein the first unique identifier, the second unique identifier, and the third unique identifier are further digitally signed with a key.

13. The system of claim 10, wherein the contents upon which the hash function is applied includes portions of the first file, second file, and third file that are relevant to use for execution of the first file, second file, and third file and wherein the contents upon which the hash function is applied excludes portions of the first file, the second file, and the third file that change from build to build.

14. The system of claim 10, further comprising deleting one file from the system based on a least recently used basis.

15. A non-transitory computer-readable storage device storing instructions which, when executed by a processor, cause the processor to perform an incremental software installation on a device by:
identifying, by the device, a first file and a second file that are stored on the device, wherein the first file is required to execute a first software program previously installed on the device and the second file is required to execute a second software program previously installed on the device;
receiving, by the device, a list of files that are required to execute a third software program, the list of files comprising the first file, the second file, and a third file;
generating, by the device during runtime, a unique identifier for each of the first file, second file, and third file, wherein the unique identifier is generated using a hash function applied to contents of the first file, second file, and third file to generate a first unique identifier, a second unique identifier, and a third unique identifier, respectively;

determining, by the device, whether files included in the list of files are present on the device to yield a determination, wherein the determination includes an analysis of the first unique identifier, second unique identifier, and third unique identifier;

based on the determination, receiving the third file at the device; and building, by the device, the third software program at the device using the first file, the second file, and the third file.

16. The non-transitory computer-readable storage device of claim 15, wherein the third file is received from a second device that transmitted the third file using data compression.

17. The non-transitory computer-readable storage device of claim 15, wherein the third file is received using multi-threading communications with overlapped decompression.

18. The non-transitory computer-readable storage device of claim 15, wherein determining whether the files included in the list of files are present on the device comprises comparing the first unique identifier, the second unique identifier, and third unique identifier with identifiers contained in the list of files.

19. The non-transitory computer-readable storage device of claim 15, wherein the first file is not required to execute the second software program and the second file is not required to execute the first software program.

20. The non-transitory computer-readable storage device of claim 15, wherein the list of files further comprises a fourth file, wherein the fourth file is required to execute the first software program and the second software program.

* * * * *